US012716808B2

(12) United States Patent
Petitgrand et al.

(10) Patent No.: US 12,716,808 B2
(45) Date of Patent: Aug. 25, 2026

(54) METHOD AND DEVICE FOR DETERMINING GEOMETRIC INFORMATION RELATING TO INTERFACES OF AN OPTICAL ELEMENT

(71) Applicant: FOGALE NANOTECH, Nîmes (FR)

(72) Inventors: Sylvain Petitgrand, Caissargues (FR); Eric Legros, Nîmes (FR)

(73) Assignee: FOGALE NANOTECH, Nîmes (FR)

( * ) Notice: Subject to any disclaimer, the term of this patent is extended or adjusted under 35 U.S.C. 154(b) by 119 days.

(21) Appl. No.: 18/728,376

(22) PCT Filed: Jan. 16, 2023

(86) PCT No.: PCT/EP2023/050867
§ 371 (c)(1),
(2) Date: Jul. 11, 2024

(87) PCT Pub. No.: WO2023/135295
PCT Pub. Date: Jul. 20, 2023

(65) Prior Publication Data

US 2025/0102397 A1 Mar. 27, 2025

(30) Foreign Application Priority Data

Jan. 17, 2022 (FR) ....................................... 2200358

(51) Int. Cl.
*G01M 11/02* (2006.01)
*G01B 11/06* (2006.01)
(Continued)

(52) U.S. Cl.
CPC ..... *G01M 11/0271* (2013.01); *G01B 11/0608* (2013.01); *G01B 11/27* (2013.01); *G01M 11/0221* (2013.01); *G02B 27/62* (2013.01)

(58) Field of Classification Search
CPC .......... G01M 11/0271; G01M 11/0221; G01B 9/0209; G01B 11/27; G01B 11/0608; G02B 27/62
See application file for complete search history.

(56) References Cited

U.S. PATENT DOCUMENTS

2007/0247639 A1* 10/2007 Amstel ............ B29D 11/00932 356/601
2008/0304080 A1* 12/2008 Ueki .................. G01M 11/0221 356/127

(Continued)

FOREIGN PATENT DOCUMENTS

JP 2001147174 A 5/2001
WO WO-2020245511 A1 * 12/2020 ........ G01M 11/0271

OTHER PUBLICATIONS

International Search Report and Written Opinion received for PCT/EP2023/050867, mailed Apr. 13, 2023.

(Continued)

*Primary Examiner* — Jennifer D Bennett
(74) *Attorney, Agent, or Firm* — Greer, Burns & Crain, Ltd

(57) ABSTRACT

A method for determining an item of information of an interface of an optical element including several interfaces, the method being implemented by a device having at least one optical sensor and at least one light source in order to make a beam pass through at least one of the interfaces and be reflected by the interface to be measured, and in order to detect a signal of interferences between the reflected beam and a reference beam is disclosed. The method also includes
positioning of a coherence area at the level of an interface;
at least two measurements of the interface in order to produce one interference image per measurement from respective interference signals;
(Continued)

rotation of the optical element about a reference axis of the device between the measurements; and
processing of the at least two images in order to obtain an item of information of the interface.

14 Claims, 3 Drawing Sheets

(51) Int. Cl.
*G01B 11/27* (2006.01)
*G02B 27/62* (2006.01)

(56) References Cited

U.S. PATENT DOCUMENTS

| | | | | |
|---|---|---|---|---|
| 2010/0097619 | A1* | 4/2010 | Ge | G01M 11/0271 356/511 |
| 2012/0133924 | A1 | 5/2012 | Heinisch et al. | |
| 2015/0192769 | A1 | 7/2015 | Dresel et al. | |
| 2016/0047712 | A1 | 2/2016 | Colonna De Lega et al. | |
| 2022/0357236 | A1* | 11/2022 | Courteville | G01B 11/2441 |

OTHER PUBLICATIONS

French Search Report received for Application No. 2200358, dated Dec. 2, 2022.

* cited by examiner

METHOD AND DEVICE FOR DETERMINING GEOMETRIC INFORMATION RELATING TO INTERFACES OF AN OPTICAL ELEMENT

BACKGROUND

The present invention relates to a method for determining an item of geometric information of interfaces in an optical element comprising at least two interfaces. It also relates to a device for determining an item of geometric information of interfaces in such an optical element.

The field of the invention is, non-limitatively, that of optical control and measurement systems, in particular for the manufacture of optical elements.

Optical elements, such as optical assemblies or imaging objectives, are generally constituted by one or a plurality of lenses and optionally other components, such as beam splitters or filters, intended to shape optical beams. These components, or these lenses, can be assembled in the form of stacking along an axis in a support such as a barrel.

Each surface or interface of an optical element can be described by an optical axis, a vertex (apex) or the centre of curvature of the surface. The optical axis is an axis of rotational symmetry in a rotational symmetry approximation. The optical axis can be the axis passing through the apex and the centre of curvature of a surface.

The optical performance of an optical element, for example an imaging objective, depends essentially on the manufacturing precision of the optical components (such as the lenses) of which it is composed, and the precision with which they are positioned in the assembly. During the manufacture of the optical elements or the manipulation of their components, it may be necessary to measure and control the alignment of the components with respect to a reference axis or to the other components.

Errors called centring errors are present when the optical axis of an interface and the reference axis or the axis of another interface are not coincident, i.e. they are different in terms of position and direction.

It may also be necessary to measure thicknesses or positions of the components of the optical element, or distances between them. The precision of the measurements of these geometric parameters depends on the centring errors.

Methods for measuring the centring errors are known. By way of example, the alignment of a measurement optical beam, constituting a reference axis, with an overall optical axis of a measured optical element is performed by propagating an alignment optical beam through the components of the optical element, and detecting the reflected beam on a CCD or PSD type optical sensor. The sensor makes it possible to indicate the displacement of the reflected beam, which effects a trajectory on the sensor when the optical element is set in rotation about an axis aligned with that of the measurement beam. The position of the optical element and its angular orientation with respect to the beam are thus measured and can be corrected so as to minimize the extension of the trajectory of the reflected beam.

However, for assemblies of several lenses, when two interfaces are close or two centres of curvature happen to be close, the measurement beam can be reflected by these two interfaces simultaneously for one and the same focusing point on the camera. Thus, the measured trajectory represents a superimposition of the two signals, thus leading to a mixed result. The ability to distinguish is set by the imaging optics, i.e. their depth of field. This problem increases as the size of the objectives reduces, in particular for mobile objects, such as smartphones.

Moreover, the measurement head is generally displaced along the measurement axis in order to place the focusing point of the measurement beam in the vicinity of the surface to be measured. These displacements are often associated with variations in the axis of the measurement beam around the reference axis of the measurement system (these displacements of the displacement means of the measurement head being called tip, tilt, and yaw).

As a result, it is necessary to be able to distinguish between the different interfaces of an optical element in a reliable and effective manner.

SUMMARY

A purpose of the invention is to propose a measurement method and device, for determining an item of geometric information of interfaces or of surfaces of an optical element comprising at least two interfaces, this device and this method allowing improved measurements of interfaces in an optical assembly.

Another purpose of the present invention is to propose a measurement method and device allowing the evaluation and/or correction of decentring with a good discriminatory power, even for very close interfaces of an optical element.

Yet another purpose of the present invention is to propose a measurement method and device the measurements of which can be used directly in order to obtain geometric parameters of the measured interfaces.

At least one of these purposes is achieved with a measurement method, for determining an item of geometric information of an interface to be measured of an optical element with respect to a measurement axis, the optical element comprising at least two interfaces, the method being implemented by a measurement device having a reference axis and comprising interferometric measurement means with at least one optical sensor and at least one low-coherence light source, configured for directing a measurement beam along the measurement axis towards the optical element so as to pass through at least one of the at least two interfaces and to be reflected by the interface to be measured and generate a reflected measurement beam, and for selectively detecting an interference signal resulting from interferences between the reflected measurement beam and a reference beam, the device further comprising positioning means and digital processing means, the method comprising the following steps:

- relative positioning, by the positioning means, of a coherence area of the light source at the level of an interface to be measured;
- at least a first step of measurement and a second step of measurement of the interface, by the interferometric measurement means, so as to produce one interference image per measurement step from respective interference signals;
- rotation of the optical element about the reference axis between the measurement steps; and
- processing, by the digital processing means, of the at least two interference images, so as to obtain an item of information relating to the interface to be measured.

Within the scope of the present invention, an "optical element" can denote any type of optical object, intended for example to be inserted in an optical beam, to shape an optical beam, and/or to produce an image. It can denote for example:

- a single optical component such as a lens or a beam splitter;
- an assembly of lenses and/or other optical components, such as an imaging or camera objective, or a device for shaping an optical beam.

An optical element can in particular be constituted by, or comprise, refractive elements such as lenses. These components, or these lenses, can in particular be assembled in a barrel, this barrel being capable of also containing other optical elements such as spacers and/or beam splitters, such as filters for example.

An interference image may be a phase image, an amplitude image or a topography image. The term "interference image" thus denotes an interference signal, or a set of interference signals, processed and represented as an image.

The method according to the present invention makes it possible to effect measurements of interfaces of an optical element, and in particular stacked interfaces, in order to deduce therefrom an item of information relating to each measured interface. These interfaces may for example comprise surfaces of lenses.

The measurements may be performed with a measurement beam of an interferometric sensor illuminated by a low-coherence light source. The measurement beam defines the measurement axis of the measurement device. A coherence area of the light source is positioned relatively at the level of at least one interface to be measured. The interface to be measured may be a "buried" interface, i.e. one of the interfaces inside the optical element. In order to reach such a buried interface, the measurement beam must therefore pass through other interfaces of the optical element.

By "coherence area" is meant the area in which interferences between the measurement beam and a reference beam may form on the optical sensor. The coherence area can be displaced by varying the difference in the length of the optical path between the two beams, for example by modifying the optical length of one or both of the beams. When the coherence area is located at the level of an interface, signals of interference between the measurement beam reflected by this interface and the reference beam may be acquired, in order thus to obtain an interference image.

Owing to the rotation of the optical element, at least two interference images are acquired. These different images, for one and the same interface, make it possible to observe the differences between them, in order to deduce therefrom an item of information relating to the measured interface.

The method according to the invention makes it possible to selectively obtain at least two interference images for each interface at the level of which the coherence area is positioned, i.e. for each surface located in the coherence area. In fact, the coherence length of the light source is adjusted so as to be shorter than a minimum optical distance between two adjacent interfaces of the optical element. Thus, for each measurement, a single interface is located in the coherence area, and therefore an acquired interference signal only comprises the contribution mainly from a single interface, or only originates from a single interface. The interference images can thus be obtained mainly or solely for the interface at the level of which the coherence area is positioned, making it possible to perfectly distinguish the contribution of the measured interface.

Thus, owing to the use of the interference images of the different interfaces, two interfaces of one and the same optical element, and in particular two adjacent interfaces, can be distinguished in a sure and reliable manner.

The interference measurements are effected according to a field of view determined by the measurement means of the device. The measurements are preferably performed in full field mode.

According to an embodiment, the processing step may comprise the identification of one and the same point of interest in every interference image.

This point of interest may be a characteristic point of the interface, for example a maximum height point or a characteristic shape appearing from one image to another. The point of interest may then be followed during the rotation between two measurement steps.

According to an embodiment, the processing step may comprise a step of determining an item of decentring information of the interface.

This step makes it possible to determine decentring, and in particular alignment errors between the optical axes of the interfaces and the measurement axis.

Owing to the use of the interference images of the different interfaces, no prior or additional measurement step, with different or additional measurement means, need be effected for the determination of the centring errors. In fact, the interference images may be used simultaneously in order to deduce therefrom other characteristics of the measured interfaces, and in particular geometric parameters of these interfaces, and this is simultaneous with the determination of the centring errors.

The method according to the present invention makes it possible to determine an item of decentring information of the interfaces of an optical element in a reliable and precise manner, and independently for each interface.

The method according to the invention may further comprise a step of correcting the decentring of the interface.

According to an example, the correction step may be performed by a displacement of the optical element relative to the measurement beam in a plane perpendicular to the reference axis.

The alignment of the measurement beam is thus adjusted with respect to an interface to be measured, for example when the measurement beam is not centred on the apex of the interface.

Alternatively or in addition, the correction step may be performed by a rotation of the optical element in a plane containing the reference axis. In other words, the rotation of the optical element is performed along two axes perpendicular to the reference axis.

The alignment of the measurement beam is thus adjusted angularly with respect to an interface to be measured, for example when the optical element is inclined with respect to the measurement axis.

These mechanical adjustments make it possible to obtain more precise measurements.

According to an embodiment, the processing step may also comprise a step of digitally correcting the decentring of the interface.

The centring errors are calculated from the analysis of the interference images. The results of these calculations can then be used for the rectification of later measurements.

Advantageously, the processing step may further comprise a step of obtaining an item of geometric information of the interface to be measured.

The measurements make it possible to determine, for example, geometric shapes and positions of the interfaces.

This item of geometric information may relate to the optical shape and/or the geometric shape of the interface to be measured, and/or optical, or geometric, distances representative of the shape and/or the position of the interface.

The geometric information may comprise geometric parameters of the interface such as:

- the position of the apex, with respect to an axis of the optical element, or relative to the position of the apex of another interface,
- the centre of curvature, with respect to an axis of the optical element, or relative to that of another interface,
- the optical shape of the profile of the interface, and/or
- the optical axis, represented, for example, by a normal to the interface at the apex point, with respect to an axis of the optical element.

Geometric parameters can also be defined for each optical component or between the optical components of the optical element. As a result, it is possible to define the following geometric parameters:

- thickness of an optical component, i.e. the difference between the positions of the apexes of the interfaces determined with respect to a measurement axis,
- "air-gap" or empty space between the apexes of two neighbouring interfaces but of different optical components. This parameter can be determined as the thickness,
- optical axes and/or inclinations of the interfaces after stacking of the optical component, and/or
- centring of the apexes of the interfaces after stacking.

Advantageously, the step of determining an item of decentring information may further comprise a correction step taking into account the optical propagation effects undergone by the measurement beam while passing through interfaces of the optical element.

In fact, during the measurement of surfaces or interfaces "buried" in the optical element, the item of decentring information can also depend on the media and the geometric parameters of the interfaces passed through by the measurement beam before reaching these buried surfaces, in particular due to modifications of wavefronts by abrupt changes in refractive index and different curvatures of the interfaces passed through, and possibly aberrations introduced. In this case, a correction must be applied in order to determine the real item of decentring information of the interfaces.

In order to effect this correction, it is possible to use a light propagation model and prior knowledge, or knowledge acquired during previous measurements on the optical element, such as refractive indices of materials and positions and shapes of interfaces passed through.

At least the step of positioning the coherence area, the measurement steps and the at least one rotation step are implemented sequentially in order to determine the item of information relating to different interfaces to be measured.

Thus, all of the interfaces of an optical element may be measured, for example, starting with the top interface and finishing with the bottom interface, passing through all the "buried" intermediate interfaces, without it being necessary to turn over or manipulate the optical element.

The processing of the interference images acquired for the successive interfaces may be performed sequentially, between measurements on the different interfaces, or once all the interference images have been acquired for all the interfaces.

According to another aspect of the invention, a measurement device is proposed, for determining an item of geometric information of an interface to be measured of an optical element with respect to a measurement axis, the optical element comprising at least two interfaces, the device having a reference axis and comprising:

- interferometric measurement means comprising at least one low-coherence light source and at least one optical sensor, configured for:
  - forming at least one measurement beam and at least one reference beam,
  - directing the measurement beam along the measurement axis towards the optical element so as to pass through at least one of the at least two interfaces, and to be reflected by the interface to be measured and generate a reflected measurement beam,
  - selectively detecting a plurality of interference signals resulting from interferences between the reflected measurement beam and the reference beam for a plurality of measurement points on the interface, in order to produce an interference image;
- positioning means configured for relative positioning of a coherence area of the light source at the level of the interface to be measured;
- angular displacement means configured for allowing a rotation of the optical element about the reference axis; and
- digital processing means configured for determining an item of information relating to the interface from at least two interference images produced at different angular positions of the optical element.

According to an embodiment, the interferometric measurement means may comprise an interferometric sensor, called full-field interferometric sensor, configured for detecting a full-field interference signal in the field of view.

The interface to be measured can then be imaged according to the field of view in a single measurement.

According to an example, the device may comprise an interferometric sensor with a Michelson interferometer.

According to another example, the device may comprise an interferometric sensor with a Mach-Zehnder interferometer.

The device according to the invention may further comprise displacement means configured for displacing the optical element relative to the measurement beam in a plane perpendicular to the reference axis.

According to an embodiment, the angular displacement means may further be configured for allowing a rotation of the optical element in a plane containing the reference axis.

The positioning means may be configured for positioning the coherence area successively at the level of different interfaces of the optical element.

This makes it possible to acquire and process interferometric signals for each interface sequentially and separately, in order to obtain items of information relating to all of the interfaces of the optical element.

The method and the device according to the invention may be implemented, in particular, for measuring optical elements or optical assemblies during production thereof, for example objectives formed of lenses or microlenses such as smartphone objectives, or for the automotive industry.

They make it possible in particular to obtain or to construct highly precise characteristic geometric values for interfaces of interest in an optical element, compare expected and measured characteristic values with threshold values and thus validate or reject an optical element component during the production process.

BRIEF DESCRIPTION OF THE DRAWINGS

Other advantages and characteristics will become apparent on examining the detailed description of examples that are in no way limitative, and from the attached drawings, in which.

DETAILED DESCRIPTION

It is well understood that the embodiments that will be described hereinafter are in no way limitative. Variants of the invention can be envisaged in particular comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, elements common to several figures may retain the same reference.

Figure 1:
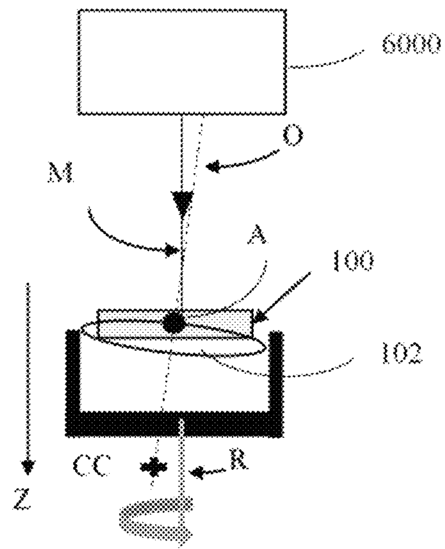
FIG. 1 is a diagrammatic representation of an implementation of a measurement device according to the present invention.

FIG. 1 is a diagrammatic representation making it possible to visualize the principle of the present invention.

A measurement device 6000 is arranged in order to effect measurements of geometric parameters of an interface to be measured of an optical element 1000, comprising at least two interfaces, with respect to a measurement axis M.

In the example represented in FIG. 1, the optical element 1000 is a lens 102 arranged in a barrel along an axis Z. Geometric parameters of one of the surfaces of the lens are represented: the apex A of the surface, the centre of curvature CC and an axis of symmetry, called optical axis O. The optical axis O is an axis of rotational symmetry for the surface in question.

The optical element 1000 can be set in rotation about a reference axis R of the measurement device 6000 by angular displacement means. For example, the optical element 1000 can be placed on a rotary platform (not represented), such as a turntable, in order to be able to pivot the optical element 1000 about the axis of rotation of the turntable.

The measurement device 6000 comprises an interferometer with at least one low-coherence light source and at least one optical sensor. A measurement beam produced by the light source is directed towards the optical element 1000 along the measurement axis M, so as to pass through the interfaces of the optical element 1000. The interferometer is configured for producing an interference signal originating from the interference between the measurement beam reflected by the interface to be measured and a reference beam. The interference signal is detected by the sensor. This interference signal contains a topography measurement of the interface from which the measurement beam is reflected, and therefore items of geometric and centring information thereof. One or more interference signals are thus acquired according to a field of view on the interface.

The device 6000 according to the invention also comprises positioning means for relative positioning of a coherence area 100 of the interferometer at the level of the interface to be measured of the optical element 1000.

The device 6000 further comprises digital processing means configured for determining an item of decentring information of the interface from the interference images produced at different angular positions of the optical element. The processing means comprise at least one computer, a central processing or calculation unit, a microprocessor, and/or suitable software means.

Figure 2:
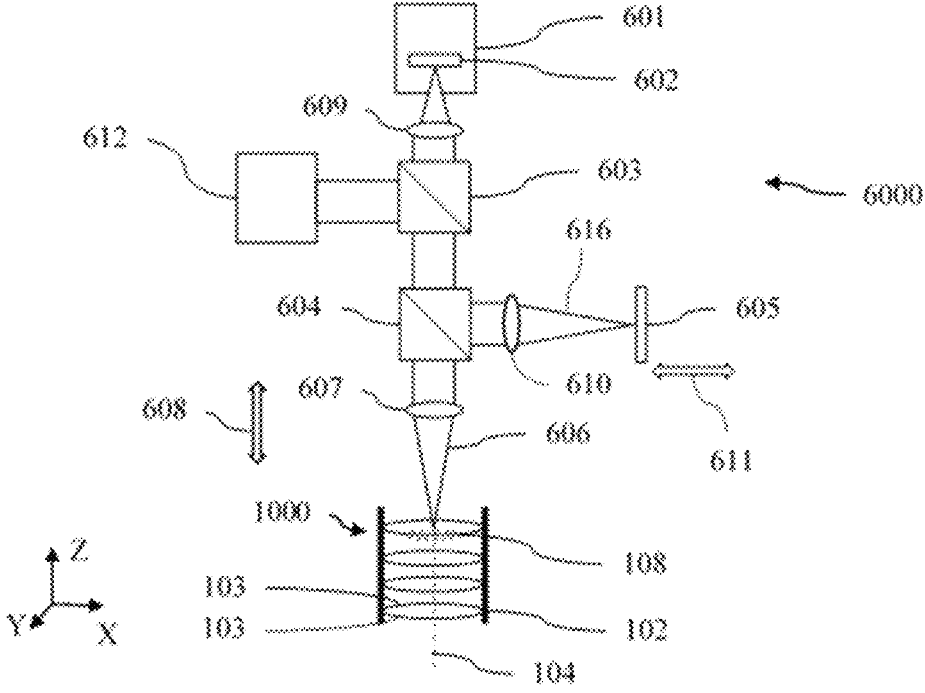
FIG. 2 is a diagrammatic representation of a non-limitative embodiment example of a measurement device that may be implemented within the scope of the present invention.

FIG. 2 is a diagrammatic representation of an example of an interferometric device that can be implemented within the scope of the present invention.

In the example represented in FIG. 2, the optical element 1000, of the camera objective type, is constituted by a barrel in which lenses 102 are positioned. The lenses 102, aligned along an optical axis 104, have surfaces or interfaces 103.

The interferometer 6000, represented in FIG. 2, is a full-field low-coherence interferometer.

The device 6000 is based on a Michelson or Linnik interferometer formed by a splitter element 604, in the form of a cube or a beam splitter, with a measurement arm which directs a measurement beam 606 towards the optical element to be measured 1000, and a reference arm with a mirror 605 to shape a reference beam 616.

The interferometer 6000 is illuminated by a low-coherence source 612 via a light splitter element 603 in the form of a cube or a beam splitter. The source 612 can comprise, for example, a superluminescent diode (SLD), a diode, a thermal light source (halogen lamp etc.) or a supercontinuum source. The source 612 can also comprise a filtering device, for example with a grating and a slit, or interference filters, for adjusting the coherence length to a few tens or a few hundreds of microns. The source 612 can be arranged to emit in visible wavelengths or the near infrared, around one or more wavelengths.

Of course, the splitter elements 603, 604 can be non-polarizing, or polarizing and associated with quarter-wave splitters to make lossless couplers.

The measurement 606 and reference 616 beams, reflected into the two arms of the interferometer respectively, are directed via the light beam splitter 603 towards a camera 601 with a sensor 602 comprising a detection matrix, for example of the CMOS or CCD type.

When the optical path difference between the measurement 606 and reference 616 beams is less than the coherence length of the source 612, interferences are obtained on the detector 602.

The device 6000, as represented in FIG. 2, also comprises a focusing lens or objective 607, and a tube lens 609, arranged so as to define an object plane conjugate to an image plane formed on the sensor 602. The reference arm further comprises an objective 610 which also defines, with the tube lens 609, a reference object plane conjugate to the image plane of the sensor 602.

The device 6000 is a full-field imaging device, which makes it possible to image interfaces 103 of the optical element 1000 according to a field of view 108 which is determined by the field of view of the imaging system and by its numerical aperture at the level of the focusing objective 607. In fact, in order to obtain a measurement, it is necessary for the specular reflection of the measurement beam 606 on the interfaces 103 to be coupled back into the imaging system.

Normally, the device 6000 comprises optical elements for focusing the illumination beam in the rear focal plane of the focusing objective 607 and of the objective 610 of the reference arm. The illumination beams are not represented in the figure for reasons of clarity.

The device 6000 also comprises a first positioning or displacement means 611 for varying the length of the reference arm, for example in the form of a translation stage 611 displacing the reference mirror 605. The objective 610 of the reference arm can also be adjustable to keep the reference mirror 605 in an object plane conjugate to the image plane formed by the sensor 602.

The device 6000 also comprises a second displacement means 608 the function of which is to displace the object plane conjugate to the image plane formed by the sensor 602, so as for example to sequentially image the successive interfaces 103 on the sensor 602. This displacement means 608 can comprise a system for displacing the focusing objective 607 or lenses of this objective, for example with a linear or helical translation device. Alternatively or in addition, this displacement means 608 can comprise a translation device or stage for displacing the device 6000 relative to the optical element 1000, or vice versa.

The device 6000 further comprises transverse displacement means (not represented) for displacing the optical element 1000 relative to the measurement beam 606 in the X-Y plane, as well as angular displacement means (not represented) allowing the rotation of the optical element 1000 about the reference axis R, as described with reference to FIG. 1.

With the measurement device 6000, when a surface or an interface 103 of an optical element 1000 appears in the coherence area, an interference structure resulting from the interferences between measurement 606 and reference 616 beams for the field of view 108 is obtained on the sensor. Items of geometric information of the interfaces can be deduced from these interference structures.

The device according to the invention, implementing for example an interferometer according to the embodiment represented in FIG. 2, can be used to implement the steps of the method according to the invention which will be described hereinafter.

Figure 3:
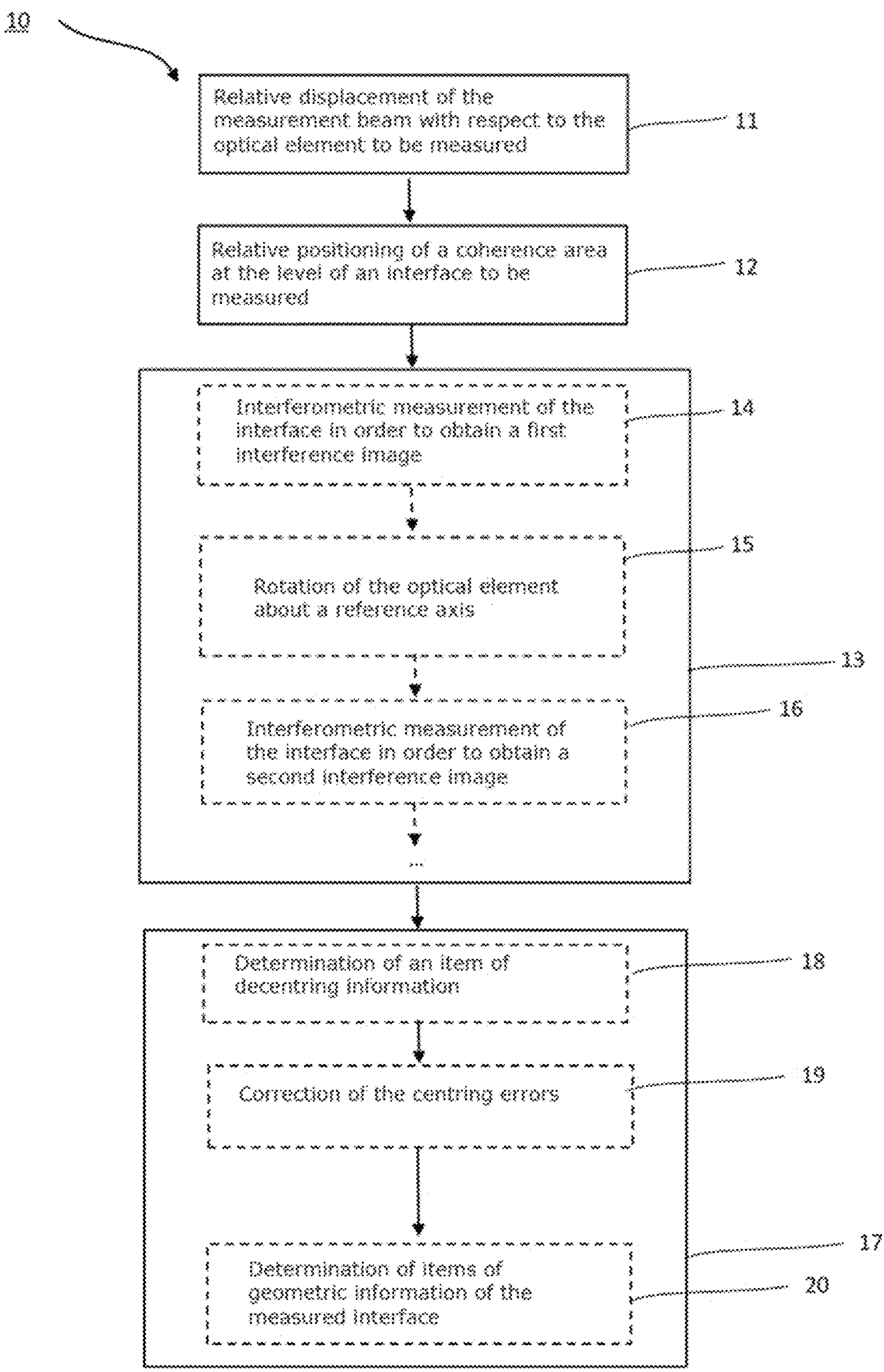
FIG. 3 is a diagrammatic representation of a non-limitative embodiment example of a measurement method according to the present invention.

FIG. 3 is a diagrammatic representation of a non-limitative embodiment example of a measurement method according to the invention.

The method 10, represented in FIG. 3, comprises a step 11 of relative displacement of the measurement beam 606 with respect to the optical element 1000 to be measured. This step 11 makes it possible to make the optical axis O of the interface to be measured 103 coincident with the measurement axis M of the measurement device 6000, the measurement axis M being materialized by the measurement beam. This relative displacement can be performed by the transverse displacement means of the device 6000.

The step 11 of relative displacement of the measurement beam 606 can be effected prior to the measurements of decentring and possibly of items of geometric information.

This step 11 can also be performed after having determined a centring error by implementing the method 10 according to the present invention, in order to correct this centring error of the interface to be measured 103 and to repeat the following steps of the method 10.

During a step 12 of the method 10, a coherence area is positioned relatively at the level of an interface to be measured 103 of the optical element 1000.

If the depth of field of the focusing objective 607 is sufficient to obtain a signal from all the interfaces 103 of the element to be measured, by modifying the optical length of the reference arm, for example by displacing the reference mirror 605, the coherence area in which interferences between the measurement 606 and reference 616 beams can form on the sensor 602 is displaced. When this coherence area passes through an interface 103, it is possible to acquire interference signals at all points of the measurable field of view 108.

The method 10 can also comprise a step (not represented) of relative positioning of an object plane conjugate to the image plane on the sensor 602 at the level of the interface to be measured 103.

In fact, it is preferable to position the interface 103 to be measured in an object plane conjugate to the image plane situated on the sensor 602, by varying the focusing distance of the measurement beam 606 such that the measurement beam is focused on the interface in question. This makes it possible to optimize the power coupled back into the imaging system and to measure the interface according to a field of view 108 with steeper local gradients, by virtue of a better utilization of the numerical aperture of the focusing objective 607.

The displacement of the coherence area can be effected, for example, by displacing the reference mirror 605.

The displacement of the object plane in order to position it on the successive interfaces is effected, for example, by varying the distance Z between the focusing objective 607 and the optical element to be measured 1000, and/or by varying the focusing distance of the focusing objective 607 or other optical elements inserted into the measurement beam 606. The detection of the optimum focusing distance can be effected based, for example, on a criterion of maximum coupled-back power, or maximum image contrast or interference fringes.

The two displacements, of the coherence area and of the object plane, must therefore be effected in a coordinated manner, where necessary, so as to superimpose the coherence area on the object plane in question.

During an image acquisition phase 13 of the method 10, interference images are produced for different angular positions of the interface to be measured 103.

During a first measurement step 14, an interference signal is acquired from the interface to be measured 103 for a first angular position of the optical element 1000.

Then, during a rotation step 15, the optical element 1000 is displaced angularly about the reference axis of the measurement device implemented. The setting in rotation can be effected, for example, with a turntable on which the optical element is placed. The coherence area is then displaced from a first to a second position on the interface to be measured. The rotation can be continuous or intermittent.

During a second measurement step 16, another interference signal is acquired from the interface to be measured 103 for this second angular position of the optical element 1000.

When the measurements are effected with a full-field interferometer, as illustrated in FIG. 2, full-field interference structures resulting from the interferences between the measurement beam and the reference beam for all of the field of view 108 are obtained directly on the optical sensor.

An interference image is produced from each interference signal. An interference image can thus be obtained for different angles of rotation of the interface positioned in the coherence area. The interference image can be a phase image, an amplitude image or a topography image. Different known methods can be used to obtain an interference image from the interference signal, such as profilometric or digital holography methods.

The steps of measurement and of rotation of the optical element are repeated as many times as desired or necessary. Preferably, at least three interference images are acquired for three angular positions of the optical element 1000. In fact, for one and the same measurement point on the measured interface, the corresponding interference signal on the optical sensor effects a circular trajectory when the optical element is set in rotation. The trajectory can be defined by the circle delimited by the triangle formed by three points, therefore three interference signals corresponding to one measurement point for three different angular positions of the optical element.

By way of example, between three and about 30 interference images per interface can be acquired.

Figure 4:
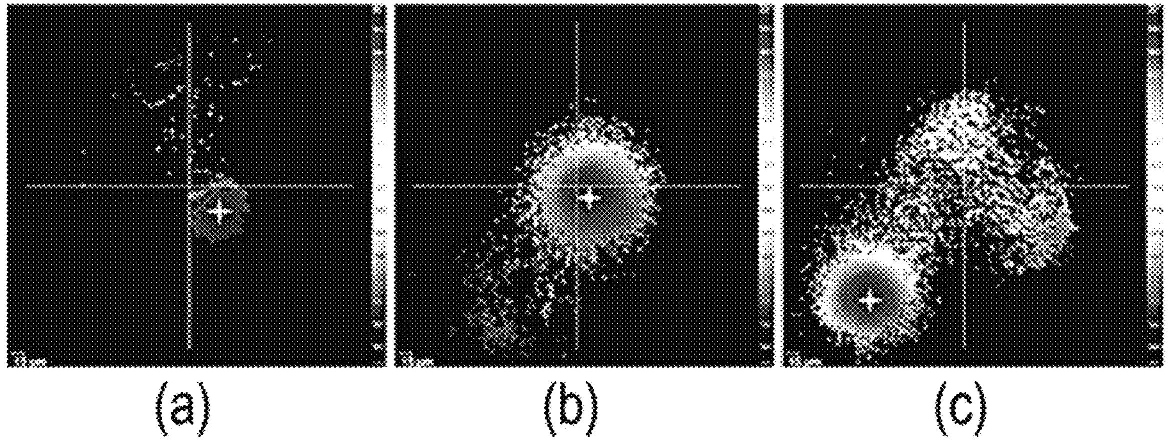
FIG. 4 shows examples of interference images obtained with a method according to the present invention.

FIG. 4 shows examples of topography images obtained by digital holography microscopy (DHM). The images (a), (b) and (c) represent three interfaces placed one below another in an optical objective, the interface imaged in image (a) being the upper interface. A vertex of each interface is identified and represented by a cross for each image. The vertices correspond to points of maximum height, and their coordinates are obtained in the reference frame of the optical sensor.

The centre of each image is represented by the intersection of a vertical axis and a horizontal axis, respectively.

In the example of FIG. 4, it is apparent that the interfaces have centring errors, i.e. that the optical axis of one interface and the reference axis of the measurement device and/or the axis of another interface are different in terms of position and direction. In fact, the vertices of the interfaces appear decentred on the images. In a situation of perfect alignment of the axes, the vertex of the interfaces must be aligned on the point of intersection indicated in the centre of each image. To implement the measurements represented in FIG. 4, the reference axis R is aligned on this point of intersection.

During a processing phase 17, the interference images acquired are analysed for each measured interface.

The processing phase 17 comprises a step 18 of determining an item of decentring information for the interface in question.

According to an embodiment example, this determination step 18 may be performed by identifying one and the same point of interest in each interference image of the interface. This point of interest is a characteristic point, such as for example a point of maximum height or a characteristic shape appearing from one interference image to another. This point of interest is then followed in all the corresponding images at different angles of rotation of the optical element about the reference axis R.

Figure 5:
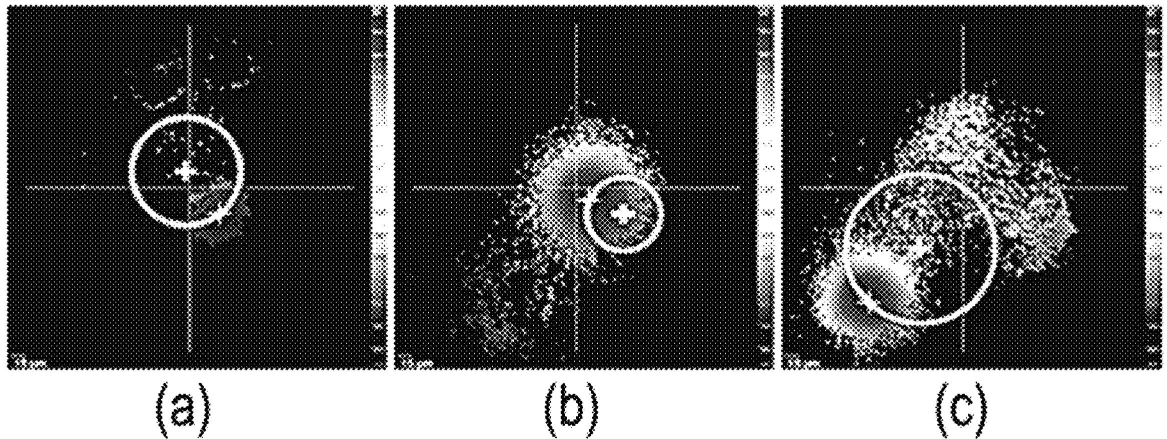
FIG. 5 shows examples of measurements obtained with the method according to the present invention.

FIG. 5 shows an embodiment example of the step 18 for determining the inclination of the optical axis of the interface and the decentring of the measurement axis with respect to the measured interface.

FIG. 5 shows the examples of topography images from FIG. 4 representing three interfaces placed one below another, in which the displacement of the vertices during the rotation of the optical element, i.e. all of its angular displacements, is indicated by circles.

It is to be noted that the point of greatest height of an interface does not necessarily correspond to its apex. In fact, when the interface is inclined with respect to the measurement axis (for example an inclined lens), the vertex of the interface can be lowered in order to make way for a new point of maximum height. This deviation causes errors of precision over the measurement of the positions of the apexes.

The circles visualize the alignment errors between the optical axis O of each interface with respect to the measurement axis M.

For the upper interface represented in FIG. 5(*a*), the centre of the circle corresponds to the intersection of the axis of rotation R with this upper interface, and the radius of the circle corresponds to the decentring of the point of maximum height of this interface with respect to this axis R.

For the buried interfaces represented in FIGS. 5(*b*) and (*c*), i.e. the interfaces which are "seen" by the measurement beam 606 through other optical interfaces, the parameters of the circle obtained include the displacements of the measurement beam due to the decentring errors of the preceding interfaces, likewise for the radius of the circle. The interpretation of the parameters of the circles must therefore take into account the propagation of the measurement beam up to and starting from the measured interface.

According to another embodiment example of the step 18 of determining an item of decentring information, a possible misalignment between the measurement beam and the reference axis of the measurement device may be identified and determined. In fact, in order to displace the object plane over the successive interfaces, the distance between the focusing objective 607 and the optical element to be measured 1000 can be varied by displacing one or the other along the Z direction. This translation can introduce alignment errors, and it is possible that the measurement beam 606 is no longer coincident with the reference axis R of the measurement device 6000.

This has the result that the centres of the circles as described previously no longer correspond to the axis of rotation O of the optical element 1000. Thus, for each interface 103, a different circle centre is obtained by acquisition of the interference images according to the different angles of rotation. The position of the origin of the circle depends on the centring error provided by the relative displacement between the focusing objective 607 of the measurement device 6000 and the optical element 1000. Knowledge of the relative positions of the origins of the circles makes it possible to obtain information about these centring errors.

In the embodiment of the method 10 represented in FIG. 3, the step 18 of determining an item of decentring information is performed after the image acquisition phase 13. According to another embodiment, the step of determining an item of decentring information may also be performed simultaneously with the image acquisition phase. In fact, each interference image may be analysed directly after it has been obtained.

According to the embodiment of the method 10 represented in FIG. 3, the processing phase 17 further comprises a step 19 of correcting the centring errors determined in the preceding step 18. This correction step 19 aims to make the optical axis O of the interface in question coincident with the measurement axis M.

According to an embodiment, the correction step 19 may be performed digitally.

The centring errors are calculated from the analysis of the interference images, as described above for step 18 of the method 10.

With reference to the example presented in FIG. 5, the centres of the circles can be referenced with respect to a reference point on the optical sensor (for example its centre) or relative to the centre of a circle of another surface. The diameters of the circles may also be evaluated with known methods, by taking into account the distances and the relative alignments between the elements of the measurement device and, if necessary, the propagation of the measurement beam and of the reflected beam through the interfaces upstream of the measured interface.

The centring errors can thus be calculated and used to correct measured values, such as items of geometric information of the interface in question, or to place them in a common reference frame in order to be able to compare them or manipulate them with those of other measured interfaces of the optical element.

According to an embodiment, the method according to the invention may further comprise a step of correcting the centring errors performed mechanically. This step may be performed as an alternative or in addition to the digital correction step 19 described above. In the embodiment of the method 10 represented in FIG. 3, the mechanical correction step is visualized by the step 11 of relative displacement of the measurement beam with respect to the optical axis of the interface to be measured. In fact, the mechanical correction step is of interest in particular for repeating the steps of the method, with the aim of determining items of geometric information of interfaces as precisely as possible.

According to one example, the optical element 1000 may be displaced relative to the measurement beam 606 in a plane perpendicular to the reference axis R. The alignment of the measurement beam 606 is thus adjusted with respect to an interface to be measured, for example when the measurement beam is not centred on the apex of the interface.

According to another example, the correction step 19 may be performed by a rotation of the optical element 1000 in a plane containing the reference axis R. The alignment of the measurement beam 606 is thus adjusted angularly with respect to an interface to be measured, for example when the optical element is inclined with respect to the measurement axis.

Of course, these displacements of translation and of rotation may also be performed cumulatively.

With reference to the example presented in FIG. 5, each circle can be centred by translation of the optical element 1000 in the plane perpendicular to the reference axis R, and by rotation in a plane passing through this reference axis R in order that its centre is coincident with or comes closer to a reference point of the image. This reference point of the image can correspond to an average of the intersections of the axis of rotation R with the different coherence areas of the beam which are displaced by the positioning means. Thus, it is preferable to align the reference axis R with the axis M of the measurement beam 606 in order that these intersections of the axis of rotation R with the different coherence areas of the measurement beam only directly cover a single point.

Still with reference to the example presented in FIG. 5, the diameter of each circle can be reduced by rotation of the optical element 1000 according to a plane perpendicular to the reference axis R so that the optical axis O of the interface in question and the reference axis R are aligned in the same direction and brought closer by translation in order to be, preferably, combined.

When all the points of maximum height of the interference images are superimposed in the centre or sufficiently close to the centre of the optical sensor, the vertex or apex of the interface has been identified. The height of the vertex can then be obtained with precision in a reference frame of the measurement device.

Thus ideally, the measurement device is aligned prior to measurements of the optical element, in particular in order to determine therefrom items of geometric information, so that the measurement axis M is coincident with the axis of rotation of the optical element.

According to one example, the beam thus reflected by a flat reference interface may be detected by the optical sensor, which can be adjusted relatively in order to place the reflected beam centred on the sensor.

According to another example, a transparent bead may be used to effect this prior alignment. The bead is translated over a rotary table in order to minimize the radius of the circle obtained as a point at the top of the bead (called H). Then, the measurement axis M is aligned by rotation in order that the radius of the circle (during the rotation) described by the bottom point B, seen through the bead, is cancelled out. Preferably, and if this is necessary, the focusing objective of the device can also be translated in order to bring the points H and B towards the centre of the image in order to keep an observation area as large as possible for the circles of interfaces to be measured. The point H can be stored as the centre of the measurement device for the next steps of rotation and translation of the optical element 1000.

According to the embodiment of the method 10 represented in FIG. 3, the processing phase 17 comprises a step 20 of determining items of geometric information of the measured interface. This determination step 20 is performed by using the correction of the centring errors effected in the preceding step 19. During this step 20, the set or a subset of interference images for an interface to be measured are processed digitally in order to deduce therefrom items of geometric information of this interface.

Items of position (or topography) information can be obtained from interference images. A characteristic measurement denoting the raw position for each interface is produced.

According to an example, this characteristic measurement may be the relative position of the measured interface. The relative position can be indicated, for example, by the positions of motors for positioning or relative displacement of the interface with respect to the focusing objective, in the three directions X, Y and Z.

According to a second example, the characteristic measurement may be the amplitude of the peaks corresponding to interferogram envelopes obtained for all of the measured interfaces.

For the digital processing of the interference signals obtained on the optical sensor, known methods can be implemented, such as algorithms based on phase-stepping interferometry (PSI) or vertical scan interferometry (VSI), or digital holography microscopy (DHM).

The determination step 20 thus provides a set of items of geometric information about the measured interfaces:

- coordinates in the reference frame of the measurement device, these coordinates being able to comprise, for each interface, the positions of points of interest such as the apexes, vertices, valleys, etc.,
- relative positions by comparing the coordinates of the points of interest belonging to different interfaces,
- distances between apexes.

According to a non-limitative embodiment (not represented), the processing phase 17 of the method according to the invention may comprise a correction step for taking into account the media passed through by the measurement beam. This correction can be applied to the optical or geometric distances and positions obtained previously.

According to a first example, this correction step may be performed by using propagation models of the electromagnetic waves through the different materials and interfaces up to the interface in question, including all the optical components of the measurement device and the interfaces of the optical element to be measured 1000 passed through.

According to a second example, the correction step may be performed by calculating a point spread function (PSF) or an optical transfer function (in the Fourier domain) of the optical system passed through by the measurement beam up to the interface in question, including all the optical components of the measurement device and the interfaces of the optical element to be measured passed through.

The correction step may also be performed using items of design information about the optical element, where they are available.

Advantageously, the correction step may be implemented prior to steps 18, 19 and 20 of the processing phase 17 described above, in order that these steps can be performed on corrected data of the optical propagation effects.

Of course, the invention is not limited to the examples that have just been described, and numerous modifications may be made to these examples without exceeding the scope of the invention.

The invention claimed is:

1. A measurement method, for determining an item of geometric information of an interface to be measured of an optical element with respect to a measurement axis, the optical element comprising at least two interfaces, the method being implemented by a measurement device having a reference axis and comprising interferometric measurement means with at least one optical sensor and at least one low-coherence light source, configured for directing a measurement beam along the measurement axis towards the optical element so as to pass through at least one of the at least two interfaces and to be reflected by the interface to be measured and generate a reflected measurement beam, and for selectively detecting an interference signal resulting from interferences between the reflected measurement beam and a reference beam, the device further comprising positioning means and digital processing means, the method comprising the following steps:

relative positioning, by the positioning means, of a coherence area of the light source at the level of the interface to be measured;

at least a first step of measurement and a second step of measurement of the interface, by the interferometric measurement means, so as to produce one interference image per measurement step from respective interference signals;

rotation of the optical element about the reference axis between the first measurement step and the second measurement step; and processing, by the digital processing means, of the one interference image per said measurement step, so as to obtain an item of information relating to the interface, wherein the processing step comprising a step of determining an item of decentering information of the interface and a step of obtaining an item of geometric information of the interface to be measured, wherein the same at least two interference images for one interface to be measured are used to obtain both the decentering information and the item of geometric information.

2. The method according to claim 1, characterized in that the processing step comprises an identification of one and the same point of interest in each interference image.

3. The method according to claim 1, characterized in that the method further comprises a step of correcting the decentering of the interface.

4. The method according to claim 3, characterized in that the correction step is performed by a displacement of the optical element relative to the measurement beam in a plane perpendicular to the reference axis.

5. The method according to claim 3, characterized in that the correction step is performed by a rotation of the optical element in a plane containing the reference axis.

6. The method according to claim 1, characterized in that the processing step further comprises a step of digital correction of the decentering of the interface.

7. The method according to claim 1, characterized in that the step of determining an item of decentering information further comprises a propagation correction step taking into account optical propagation effects undergone by the measurement beam while passing through the interfaces of the optical element.

8. The method according to claim 1, characterized in that at least the step of positioning of the coherence area, the measurement steps and the at least one rotation step are implemented sequentially in order to determine the item of information relating to different interfaces to be measured.

9. The method according to claim 1, characterized in that the interference image comprises one out of a phase image, an amplitude image and a topography image.

10. A measurement device, for determining an item of geometric information of an interface to be measured of an optical element with respect to a measurement axis, the optical element comprising at least two interfaces, the device having a reference axis and comprising:

interferometric measurement means comprising at least one low-coherence light source and at least one optical sensor, configured for:

forming at least one measurement beam and at least one reference beam;

directing the measurement beam along the measurement axis towards the optical element so as to pass through at least one of the at least two interfaces and to be reflected by the interface to be measured and generate a reflected measurement beam;

selectively detecting a plurality of interference signals resulting from interferences between the reflected measurement beam and the reference beam for a plurality of measurement points on the interface, in order to produce an interference image;

positioning means configured for relative positioning of a coherence area of the light source at the level of the interface to be measured;

angular displacement means configured for allowing a rotation of the optical element about the reference axis; and digital processing means configured for determining an item of information relating to the interface from at least two interference images produced at different angular positions of the optical element, the digital processing means being configured for determining an item of decentering information of the interface and for obtaining an item of geometric information of the interface to be measured.

11. The device according to claim 10, characterized in that the interferometric measurement means comprise a full-field interferometric sensor, configured for detecting a full-field interference signal in the field of view.

12. The device according to claim 10, characterized in that the device further comprises a second displacement of the optical element relative to the measurement beam in a plane perpendicular to the reference axis.

13. The device according to claim 10, characterized in that the angular displacement means are further configured for allowing a rotation of the optical element in a plane containing the reference axis.

14. The device according to claim 10, characterized in that the positioning means are configured for positioning the coherence area successively at the level of different interfaces of the optical element.

* * * * *